(12) United States Patent
Hernandez

(10) Patent No.: US 6,650,428 B1
(45) Date of Patent: Nov. 18, 2003

(54) AUTOMATED DUPLEX IMAGE GENERATION FOR A DUPLEXING IMAGE FORMING DEVICE

(75) Inventor: Tadei Hernandez, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/385,623

(22) Filed: Aug. 26, 1999

(51) Int. Cl.$^7$ ................................................ H04N 1/40
(52) U.S. Cl. .................... 358/1.13; 358/1.13; 358/3.28; 380/54; 380/55; 380/243; 380/246
(58) Field of Search ............................ 358/3.28; 380/54, 380/55, 243, 246

(56) References Cited

U.S. PATENT DOCUMENTS

| | | | | |
|---|---|---|---|---|
| 5,159,630 A | * | 10/1992 | Tseng et al. ................ 380/243 |
| 5,184,849 A | * | 2/1993 | Taylor ......................... 283/67 |
| 5,287,203 A | * | 2/1994 | Namizuka .................... 358/443 |
| 5,301,981 A | * | 4/1994 | Nesis ........................... 283/73 |
| 5,390,003 A | * | 2/1995 | Yamaguchi et al. ......... 399/366 |
| 5,421,869 A | * | 6/1995 | Gundjian et al. ......... 106/31.19 |
| 5,481,378 A | * | 1/1996 | Sugano et al. .............. 358/501 |
| 5,484,169 A | * | 1/1996 | Chang et al. ................. 283/67 |
| 5,541,993 A | * | 7/1996 | Fan et al. .................... 380/243 |
| 5,666,191 A | * | 9/1997 | Hasegawa et al. .......... 399/366 |
| 6,178,243 B1 | * | 1/2001 | Pomerantz et al. ......... 380/243 |
| 6,335,966 B1 | * | 1/2002 | Toyoda .................. 379/100.06 |

FOREIGN PATENT DOCUMENTS

GB      2211974 A    7/1989   ......... G06K/15/00

* cited by examiner

Primary Examiner—Edward Coles
Assistant Examiner—Ashanti Ghee

(57) ABSTRACT

A method and apparatus using a duplex printer to print indicia on the back side of a printed page to provide privacy for confidential information appearing on the front side and/or indicia to indicate that information which previously appeared on the back side of a printed sheet is not relevant to the information appearing on the front side of the printed sheet.

7 Claims, 3 Drawing Sheets

Fig. 3B

```
}
{****************** Screen Manager Utilities ******************}
procedure position_goto(place: position); begin
    scrn_goto(place.row, place.col);
end;

procedure display_at(r, c: integer; ch: char); begin
    scrn_goto(r, c);
    scrn_write(ch);
end;

procedure display(p: position; ch: char); begin
    position_goto(p);
    scrn_write(ch);
end;

function in_bounds(p: position): position; begin
    if p.row > Rows then
        p.row := Rows
    else if p.row < 1 then
        p.row := 1;
    if p.col > Cols then
        p.col := Cols
    else if p.col < 1 then
        p.col := 1;
    in_bounds := p;
end;
```

Fig. 3A

```
program marco(input, output);
const dir_up = -1;
      dir_down = -2;
      dir_right = -3;
      dir_left = -4;

TOKEN = '*';
PLAYER = 'P';
MARCO = 'M';

Rows = 10;
Cols = 40;
INIT_TOKENS = 10;

type position = record
         row,col: integer;
     end;

game_state = record
    board: array[1..Rows,1..Cols] of char;
    player_pos: position;
    marco_pos: position;
    token_pos: position; { position of last token taken }
    token_taken: boolean; { token taken by player }
    token_count: integer; { tokens remaining }
    marco_on_token: boolean; { marco displayed over token }
    player_tagged: boolean; { Player tagged }
end;

$include 'screen.adt'$
```

AUTOMATED DUPLEX IMAGE GENERATION FOR A DUPLEXING IMAGE FORMING DEVICE

TECHNICAL FIELD OF THE INVENTION

This invention generally relates to duplex printing. More particularly, this invention relates to a method for a duplexing image forming device which automatically generates a second side image for a sheet of media.

BACKGROUND OF THE INVENTION

Oftentimes when documents are sealed in an envelope, it is desired that the contents remain confidential until the envelope is opened. Special paper and/or security envelopes are used to prevent the envelope contents from being read by illuminating the envelope from the opposite side. In the same vein, financial information is often printed on special forms which include opaque areas to prevent the transmission of light. This requires the confidential information to be printed at pre-defined areas on the form and therefore follow a specific format. Obviously, in any of these cases, there is additional expense and effort expended to protect the information.

An additional problem, which at first blush seems unrelated, has to do with reusing single sided printed pages for generating draft documents. The problem arises in trying to distinguish between the prior printed material and the newly printed material. When printing appears on just one side of a series of printed pages there is no possibility for confusion. However, when a new print job is printed on the blank side of previously printed pages it becomes difficult to tell which is which.

It would be desirable to provide a method for protecting confidential information using standard paper and envelopes and a method to distinguish between previously printed sides of a multi-page document and the newly printed sides.

SUMMARY OF THE INVENTION

The invention uses a duplex printer to print indicia on the back side of a printed page to provide privacy for confidential information appearing on the front side and indicia to indicate that information which previously appeared on the back side of a printed sheet is not relevant to the information appearing on the front side of the printed sheet.

The invention can be implemented in several different embodiments which include a software implementation in either the application software on the host device or in the printer driver on the host device. Or, the invention can be implemented in firmware within the image forming device. In either case, it is advantageous that the image forming device have duplexing capability so that the user does not have to "re-run" the print job to print on both sides of the pages.

In the privacy mode, the invention identifies privacy zones within the original document and then maps these zones to the reverse side of the sheet using a mirror image mapping technique. The privacy zones can be designated manually by the user through a graphical user interface or automatically using imbedded codes such as a privacy font. In the case of the privacy font type implementation, the invention generates the privacy zones by demarcating the particular text within an area on the printed page within which the text resides. The location, size and shape of the zones is then mimicked in mirror image fashion on the reverse side of the printed sheet and these zones are filled with obscuring indicia to block the transmission of light and thereby protect the confidentiality of the information.

In the single side paper reuse mode, the invention prints indicia on the reverse side of the printed sheets which indicates that the information contained on the reverse side is not relevant to the printed document. This information may take the form of text, graphics, lines, etc. In one embodiment, diagonal lines are used across the entire back side of the page similar to the denotation of a cross section part in a mechanical drawing.

DESCRIPTION OF THE DRAWINGS

FIGS. 3A and 3B illustrate the first and second sides, respectively, of a single sheet on which previously printed information appears on the second side of a printed sheet which is desired to be re-used.

DETAILED DESCRIPTION OF THE INVENTION

Figure 1:
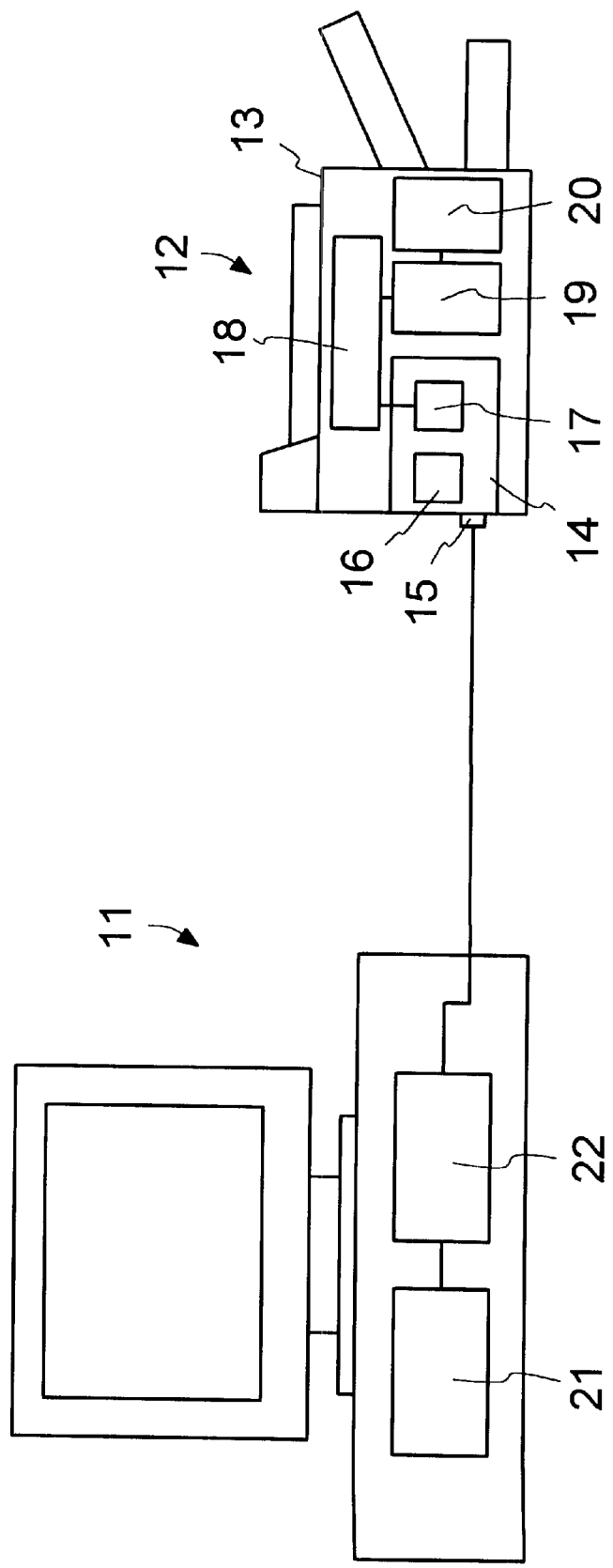
FIG. 1 is a block diagram schematic representation of a host device and a laser printer combination incorporating the invention.

Referring now to the figures a combination host device and image forming device is shown which incorporates the invention. For ease of illustration and understanding, the image forming device will be explained and shown as a laser printer, generally designated as 12 in the figures. However, it should be understood that the invention can also be implemented using other image forming devices. Additionally, the host device will be explained in terms of a personal computer (PC) generally designated as 11 in the figures. However, it should be understood that the invention can also be implemented using other document generating devices such as personal information managers, personal electronic devices, etc.

Printer 12 generally includes a housing 13 within which several main subsystems are located. A formatter 14 includes a data input 15, firmware 16 and a memory buffer 17. A printer controller 18 communicates memory buffer 17 to receive bi-level rastor data and register this data within print engine 19 to create a printed image. Other communications connections exist with printer 12 between formatter 14, printer controller 18, print engine 19 and duplexer 20 but are omitted here for the sake of simplicity and illustration.

The invention can be implemented in both hardware/firmware and software embodiments. A software implementation in either the document generation application software 21 on the device 11 or in printer driver 22 on host device 11. Or, the invention can be implemented in firmware 16 within image forming device 11. In either case, it is advantageous that image forming device have duplexing capability, such as duplexer 20, so that the user does not have to "re-run" the print job to print on both sides of the pages.

Within the various embodiments, the invention can contain a privacy mode and/or a paper re-use mode. In either mode, the images rendered on the reverse side of the media are generally referred to as "duplex images." Duplex images are herein defined as images which are either obscuring graphics in a mirror image of privacy zone(s) on the front of the media sheet or obscuring graphics which indicate the irrelevancy of the information on the back of the media sheet. In either case, they are obscuring graphics printed on the second or back side of the media sheet.

In the privacy mode, the invention identifies privacy zones within the original document and then maps these zones to the reverse side of the sheet, creating a mirror image of the zones on the reverse side of the sheet. The privacy zones can be designated manually by the user through a graphical user interface or automatically using imbedded codes, e.g. a privacy font.

In the case of manual or user generated privacy zones, a user interface, advantageously a graphical user interface, can be used to overlay graphical elements such as a semi-transparent rectangle over the confidential information to define a privacy zone. The location, size and shape of the zones are then mimicked in mirror image fashion on the reverse side of the printed sheet and these zones are filled with obscuring indicia to create the duplex image to block the transmission of light and thereby protect the confidentiality of the information.

In the case of the embedded codes implementation, the invention generates the privacy zones by demarcating the particular text within an area on the printed page within which the text resides that is identified by the embedded codes. Similar to the manually generated privacy zones, the location, size and shape of the automatically generated zones are then mimicked in mirror image fashion on the reverse side of the printed sheet and these zones are filled with obscuring indicia to create the duplex image to block the transmission of light and thereby protect the confidentiality of the information.

Figure 2B:
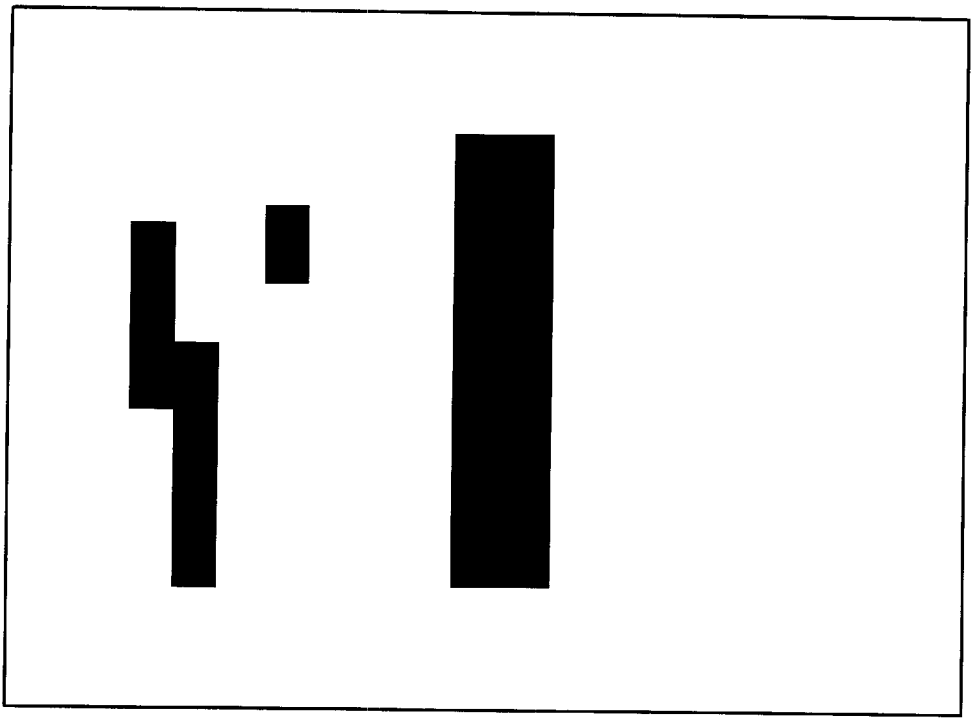
FIGS. 2A and 2B illustrate the first and second sides, respectively, of a single sheet on which confidential information appears which is desired to be protected.
Figure 2A:
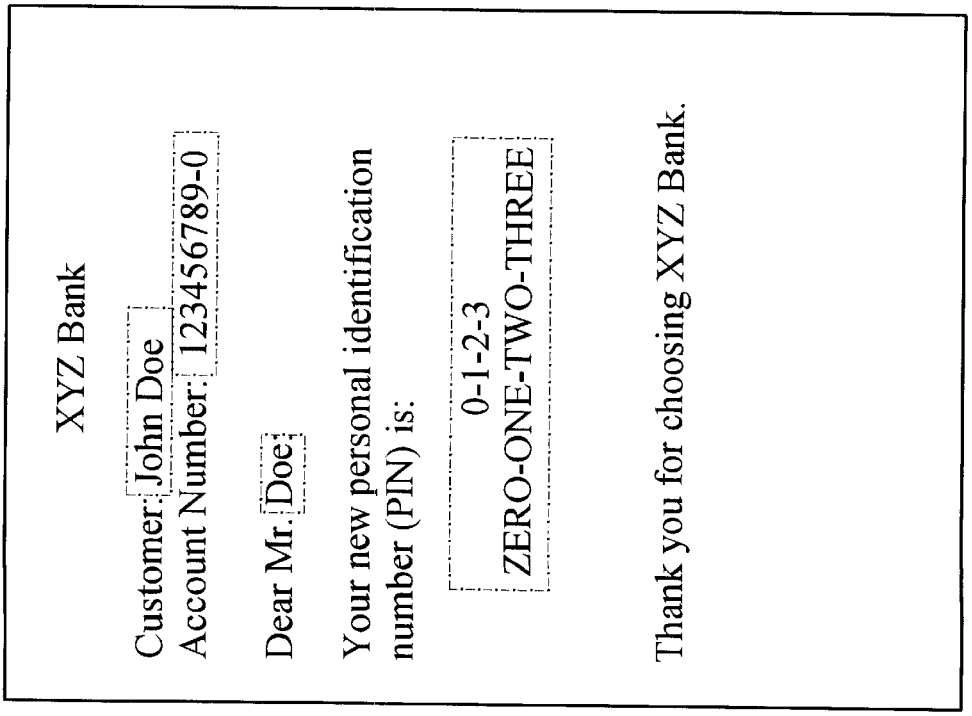

FIGS. 2A and 2B illustrate the first and second side of a single sheet on which confidential information appears which is desired to be protected. The privacy zones of FIG. 2A are denoted by the dash-dotted lines demarcating the confidential text. These zones are then mapped to the second side of the page shown in FIG. 2B in mirror image fashion and filled with obscuring indicia such as the opaque fill shown. This graphic image can take the form of a rastor bit map generated by application software 21 or printer driver 22 in the software embodiments or by firmware 16 within formatter 14 in the firmware embodiment. Alternatively, the privacy graphics can be generated in vector format by the software or firmware and rendered into the rastor images in formatter 14.

In the single side paper reuse mode, the invention prints indicia on the reverse side of the printed sheets which indicates that the information contained on the reverse side is not relevant to the printed document. This information may take the form of text, graphics, lines, etc. In one embodiment, diagonal lines are used across the entire back side of the page to create the duplex image, similar to the denotation of a cross section part in a mechanical drawing.

In both the software and firmware embodiments pre-defined full or partial page graphics can be used for the page reuse mode. In the firmware embodiment, a strike-out flag can be used for the page reuse mode to signal the formatter generate horizontal or vertical lines across the entire back side of, or a portion of, each page. Additionally, or alternatively, large font text or watermarks can be used on the back of the page to differentiate the irrelevant material on the back side from the relevant material on the front. In either the software or firmware embodiment, when the duplex image is both generated and rendered within the formatter, a duplex image "flag" can be used to signal the formatter to generate a duplex image to be printed on a second side of a sheet of media.

Printer Control Language (PCL) and/or printer job language (PJL) commands can be embedded for the necessary flag and privacy font definitions for either the software or firmware embodiments where the firmware is configured to recognize the PCL/PJL commands and render the mirror image privacy zones or strike-out indicia as indicated.

While certain embodiments of the invention have been explained in detail and referenced in the drawings, it is to be understood that the scope of the invention is not limited thereto, but should instead be defined by the issued claims and equivalents thereof.

What is claimed is:

1. An image forming device for printing automated duplex images which comprises:
   a housing;
   a print engine within the housing;
   a printer controller operatively connected and in communication with the print engine; and
   a formatter operatively connected to the printer controller, the formatter being configured to detect a duplex image flag and generate a duplex image of obscuring graphics in a mirror of a privacy zone, to be printed on a second side of a sheet of media.

2. The image forming device of claim 1 wherein the duplex image flag is a printer language command.

3. The image forming device of claim 2 wherein the formatter is configured to demarcate information designated by the printer language command to define a privacy zone which is then mimicked in mirror image fashion on a reverse side of a media sheet to be printed and filled with obscuring indicia to block transmission of light through the media and thereby protect the confidentiality of the information.

4. The image forming device of claim 2 wherein the duplex image flag is a strike-out flag and the formatter is configured to render a graphic on the second side of a media sheet to be printed to obscure any information which may appear on a first side of the media.

5. A method for forming a duplex image using an image forming device, the method comprising the acts of:
   generating privacy zones demarcating confidential information within an image to be printed on a first side of a sheet of media;
   mapping the privacy zones in mirror image fashion to a second side of the media sheet defining mirror image privacy zones; and
   filling the mirror image privacy zones with obscuring indicia.

6. A method for forming a duplex image using an image forming device, the method comprising the acts of:
   differentiating a relevant area of a sheet of media from an irrelevant area:
   setting a strike-out flag to indicate the irrelevant area of the sheet of media;
   generating an image to be printed over printed information on the irrelevant area of the media; and
   printing the image on the irrelevant area of the media.

7. The method of claim 6, wherein the relevant area is a first side of a sheet of media and the irrelevant area is a second side of the sheet of media.

* * * * *